(12) United States Patent
Watanabe et al.

(10) Patent No.: US 7,043,023 B2
(45) Date of Patent: May 9, 2006

(54) SOFTWARE DEFINED RADIO AND RADIO SYSTEM

(75) Inventors: Koji Watanabe, Kokubunji (JP); Hideya Suzuki, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 765 days.

(21) Appl. No.: 09/798,993

(22) Filed: Mar. 6, 2001

(65) Prior Publication Data

US 2002/0144134 A1   Oct. 3, 2002

(30) Foreign Application Priority Data

Feb. 16, 2001 (JP) .............................. 2001-039340

(51) Int. Cl.
*H04K 1/00* (2006.01)
(52) U.S. Cl. .................. 380/270; 455/13.4; 340/854.6
(58) Field of Classification Search ................ 380/270; 455/509, 418, 419, 510, 515, 404, 522.1, 455/13.4, 14; 375/322, 222, 133, 340, 343, 375/330; 370/329; 340/870.1, 870.08, 854.6, 340/4; 342/1, 21; 343/700, 753
See application file for complete search history.

(56) References Cited

U.S. PATENT DOCUMENTS 5,689,801 A * 11/1997 Frichtel et al. ................ 455/9
6,052,600 A * 4/2000 Fette et al. .................. 455/509
6,321,095 B1 * 11/2001 Gavette ........................ 455/517
6,336,040 B1 * 1/2002 Asano et al. ................ 455/561
6,366,622 B1 * 4/2002 Brown et al. ................ 375/322
6,411,662 B1 * 6/2002 Sakoda et al. .............. 375/340

FOREIGN PATENT DOCUMENTS

WO         99/09721         2/1999

OTHER PUBLICATIONS

"Nikkei Electronics", Mar. 6, 2000, pp. 78-80.
"Using Market-Based Spectrum Policy to Promote the Public Interest", G.L. Rosston et al, Jan. 1997.
"Comments of the SDR Forum", Before the Federal Communications Commission, Washington, D.C., in the Matter of Inquiry Regarding Software Designed Radios.
Report Concerning ITS, Electric Technique Council of Ministry of Posts and Telecommunications, Feb. 1999.

* cited by examiner

*Primary Examiner*—Kim Vu
*Assistant Examiner*—T. B. Truong
(74) *Attorney, Agent, or Firm*—Mattingly, Stanger, Malur & Brundidge, P.C.

(57) ABSTRACT

In order to provide a software defined radio and an approval system of a radio which can flexibly cope with specification alteration, a software defined radio includes a storage for holding transmission and reception characteristic information serving as a specification criterion; and a control unit for comparing a measured value obtained from a measurement circuit with the information of the specification criterion and conducting setting of the radio so as to satisfy the specification.

7 Claims, 9 Drawing Sheets

SOFTWARE DEFINED RADIO AND RADIO SYSTEM

BACKGROUND OF THE INVENTION

The present invention relates to such a radio that its function is altered by re-programming.

For each of specifications of radio systems, frequencies and transmission power are prescribed. If frequencies are assigned to a certain system once and then a system having new specifications is standardized, there is a possibility that frequencies are re-assigned. For example, in "Insufficient frequencies for IMT2000," Nikkei Communication, pp. 78–80, Mar. 6, 2000, there is disclosed such an example that movement of frequencies assigned to existing business is conducted over approximately ten years and released frequencies are re-assigned to IMT 2000. Furthermore, in Gregory L. Rosston and Jeffrey S. Steinberg, "Using Market-Based Spectrum Policy to Promote the Public Interest," January 1997, FEDERAL COMMUNICATIONS COMMISSION (FCC) of United States has proposed a policy for increasing the flexibility of frequency utilization and utilization efficiency, and promoting market competition and technical innovation. In FCC, frequency assignment is conducted by an auction system.

In response to inquiries concerning software radio from FCC of United States as described in "BEFORE THE FEDERAL COMMUNICATIONS COMMISSION Washington," In the Matter of Inquiry Regarding Software Defined Radios, ET Docket No. 00–47, NOTICE OF INQUIRY, Released Mar. 21, 2000, the SDR Forum expresses the following opinion: "FCC should test and approve a combination of hardware and software of a software defined radio. In addition, existing FCC rules pay no regard to radios which can be altered on the spot after shipping without re-approval or label re-sticking, and alteration of laws and regulations is necessary.

In Japan, a report concerning ITS submitted by Electric Technique Council of Ministry of Posts and Telecommunications in February 1999 describes that alteration of the communication system using alteration of software will be implemented in 2005.

SUMMARY OF THE INVENTION

Conventional radios cannot flexibly cope with alteration of frequency assignment. For altering the frequency assignment, a long-term plan is required. There are desired radios conforming to a system which conducts frequency assignment flexibly and capable of flexibly coping with alteration of the specification concerning the frequency and transmission power.

When conducting specification alteration by re-programming after completion of fabrication, an approval system involving complicated procedures, such as carrying radios to be altered in an approval agency and gaining re-approval, hinders making the most of flexibility of software defined radios. An object of the present invention is to implement such a system that technical conformity of a radio is approved more simply.

For making the most of the flexibility of the software defined radio, it is desirable to suppress regulations to the minimum and increase the degree of freedom of software. Another object of the present invention is to make regulations for satisfying a specification criterion compatible with freedom of specification alteration.

Furthermore, another object of the present invention is to conceal contents of software so as to prevent the contents from being analyzed and altered in the case where the software is approved and then distributed, and determine in a radio after downloading whether downloaded software is regular information which is not falsified.

In the case where a software defined radio is shipped and thereafter new software is downloaded and function alteration is conducted, there is a method of conducting a test and approval of the new software by using hardware of the same type as that already shipped, and distributing the new software. It is now assumed that a software defined radio is approved and then shipped and software of a specification different from that approved before shipping is to be installed in the radio. At this time, the hardware has a transmission capability exceeding the criterion of transmission power of the different specification and some installed software does not satisfy the different specification in some cases. Another object of the present invention is to provide a software defined radio having such a mechanism as to assure that a criterion depending upon the specification is satisfied.

Furthermore, in the case where a radio is shipped and then software is downloaded thereto to conduct function alteration, the software is installed in the radio which is different from a radio used to test the software. Therefore, there is a possibility that the specification is not satisfied for some cause such as an individual difference of the radios or a software bug. Therefore, another object of the present invention is to provide a software defined radio having a verification and correction mechanism so that the specification may be satisfied in individual radios.

Furthermore, another object of the present invention is to provide a software defined radio having a mechanism responsive to a verification result to the effect that the capability of the radio cannot satisfy the new specification, for notifying the user that the specification is not satisfied and suppressing unnecessary radio wave transmission, and a mechanism for recovering the specification by which communication can be conducted.

When altering a specification by re-programming after fabrication of a radio has been finished, a specification to be satisfied does not depend upon the configuration of the radio, but control satisfying a specification criterion depends upon the configuration of the radio. Such a situation is conceivable. For example, when implementing a radio of a certain specification, specification values such as maximum allowable power to be satisfied remain unchanged no matter which hardware is used, but the control algorithm and program may be different depending upon the hardware. Another object of the present invention is to provide a contrivance for selecting software connected with the radio configuration, when downloading software for conducting control satisfying the specification criterion, to a radio.

In accordance with an aspect of the present invention, a software defined radio includes a storage for holding information concerning a specification criterion to be implemented after alteration, and a control unit for conducting alteration on setting of the base band unit and the radio frequency unit so as to satisfy the specification criterion.

In an embodiment of the present invention described later, the software defined radio further includes a measurement circuit for the transmission and reception characteristic. And the control unit compares a measured value obtained from the measurement circuit with information concerning the specification criterion, and conducts alteration on the setting of the base band unit and the radio frequency unit so as to satisfy the specification criterion.

In another embodiment, the software defined radio includes a switch connected to the antenna, the radio frequency unit, and the measurement circuit. When the measurement circuit measures the transmission and reception characteristic, the switch disconnects the radio frequency unit from the antenna and connects the radio frequency unit to the measurement circuit so as to transmit transmission data to the measurement circuit.

In another embodiment, if the control unit cannot conduct alteration on the setting of the base band unit and the radio frequency unit so as to satisfy the specification criterion serving as a specification to be implemented after alteration, the control unit displays a message to that effect on a user interface. In that case, the control unit conducts control for suppressing radio wave transmission.

In another embodiment, software describing a specification previously confirmed to make communication possible is held. If the control unit cannot conduct alteration on the setting of the base band unit and the radio frequency unit so as to satisfy the specification criterion to be implemented after alteration, the control unit sets the specification described in the software, in the base band unit and the radio frequency unit.

In another embodiment, the control unit sets an amplification factor or an attenuation factor respectively in an amplifier or an attenuator included in the radio frequency unit so as to attain at most a transmission power prescribed by the specification criterion to be implemented after alteration.

In another embodiment, the control unit sets a filter characteristic of the base band unit so as to attain at most an occupied bandwidth prescribed by the specification criterion to be implemented after alteration.

In another embodiment, software for implementing a certain specification is delivered to a radio as follows. Information for detecting falsification is added to the software. The software with the information for detecting falsification added thereto is encrypted and delivered. And the radio decodes the encrypted software, and inspects whether the software is falsified, by using the information for detecting falsification. An embodiment of the information for detecting falsification is a cyclic redundancy check code.

In another embodiment of the present invention, software for implementing a certain specification is delivered to a radio as follows. The radio transmits a software download request of software to a server by specifying the type and the specification of the radio serving as a specification to be implemented after alteration. The server holds a plurality of pieces of software for making the radio implementing a certain specification. For each software, the server holds a specification implemented by the software, and information concerning a type of the radio in which an approval inspection was conducted. The server selects software corresponding to the type and the specification specified in the download request received from the radio, from the plurality of pieces of software, and transmits the selected software to the radio.

In another embodiment of the present invention, the server transmits a list of pieces of software which can be downloaded, to the radio. The radio selects software to be requested, from the list.

Other aspects of the present invention will be clarified in description of embodiments.

DESCRIPTION OF THE EMBODIMENTS

Figure 1:
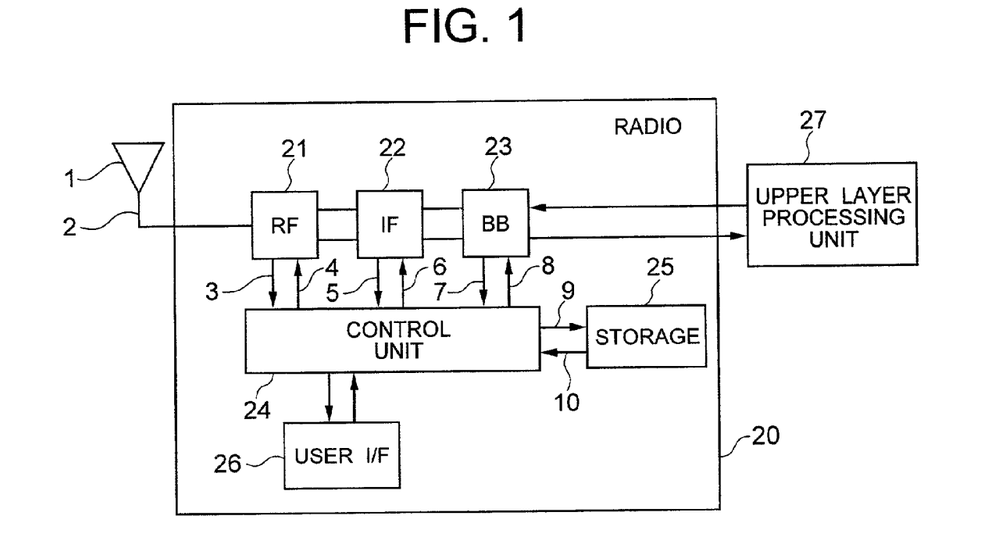
FIG. 1 is a block diagram showing an example of a radio according to an embodiment of the present invention.

FIG. 1 shows an embodiment of a software defined radio according to the present invention. In FIG. 1, a software defined radio including a storage 25 for holding a specification criterion, and a control unit 24 for conducting control so as to satisfy the specification criterion. Transmission is conducted as described hereafter. A base band (BB) unit 23 conducts base band processing such as modulation on information generated by application which functions in an upper layer processing unit 27. An intermediate frequency (IF) unit 22 up-converts resultant information to an intermediate frequency. A radio frequency (RF) unit 21 conducts amplification, up-conversion to a radio frequency, and filtering on the information of the intermediate frequency. Resultant information is transmitted from an antenna 1. On the other hand, reception is conducted as described hereafter. The RF unit 21 conducts processing on a signal received by the antenna 1, at a radio frequency and down-converts the signal to an intermediate frequency. The IF unit 22 conducts processing on the signal and converts the analog signal to a digital signal. Thereafter, the BB unit 23 conducts base band processing such as demodulation. Information outputted from the BB unit 23 is used in the application functioning in the upper layer processing unit 27.

Software downloaded via a radio channel is held in the storage 25 via the antenna 1, the RF unit 21, the IF unit 22, the BB unit 23, a signal line 7, the control unit 24, and a signal line 9. The control unit 24 transmits a control signal via a signal line 8 in order to load a program for conducting base band processing held in the storage 25 or conduct hardware setting. In addition, the control unit 24 analyzes the software held in the storage 25, and sends control signals for conducting hardware setting to the RF unit 21 and the IF unit 22 via a signal line 4 and a signal line 6, respectively. In the present embodiment, a software defined radio having an IF unit is shown. In the case of a radio using a direct conversion system, however, the IF unit becomes unnecessary. In this case, the control unit 24 is connected to the RF unit and the BB unit. This is true of ensuing embodiments as well, although not especially mentioned in description thereof.

Figure 2:
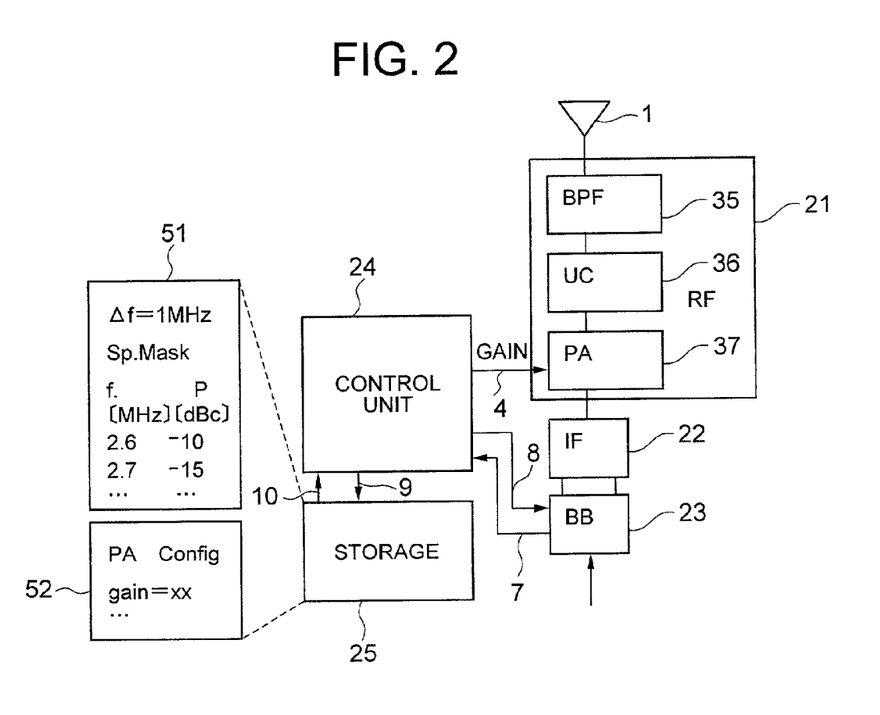
FIG. 2 is a block diagram showing an example of a radio according to another embodiment of the present invention.
Figure 3:
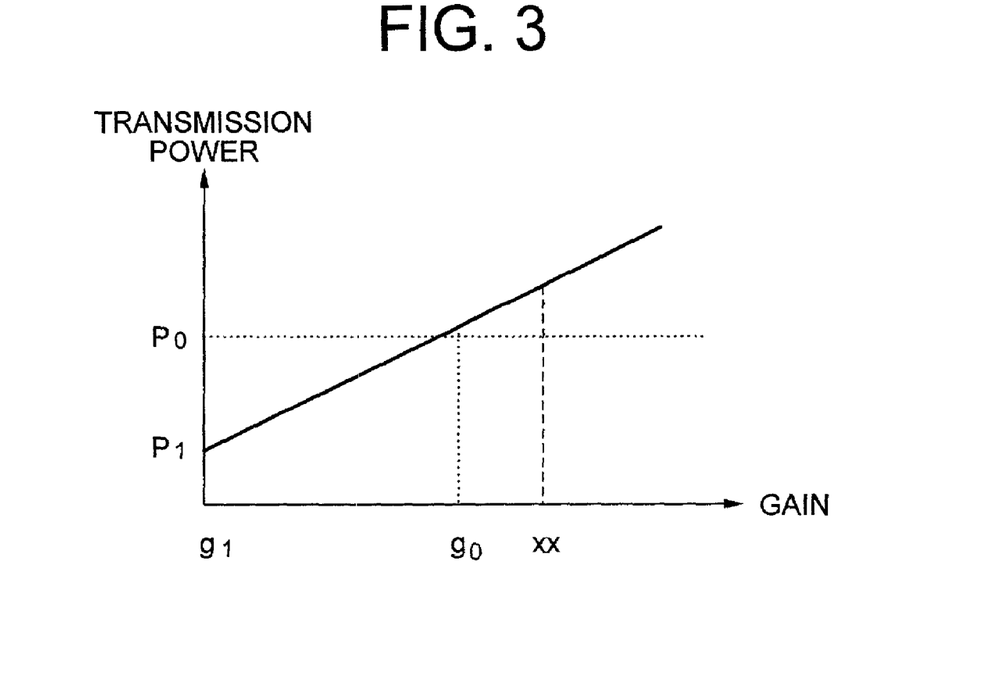
FIG. 3 is a diagram showing a control characteristic controlled in a radio according to an embodiment of the present invention.
Figure 4:
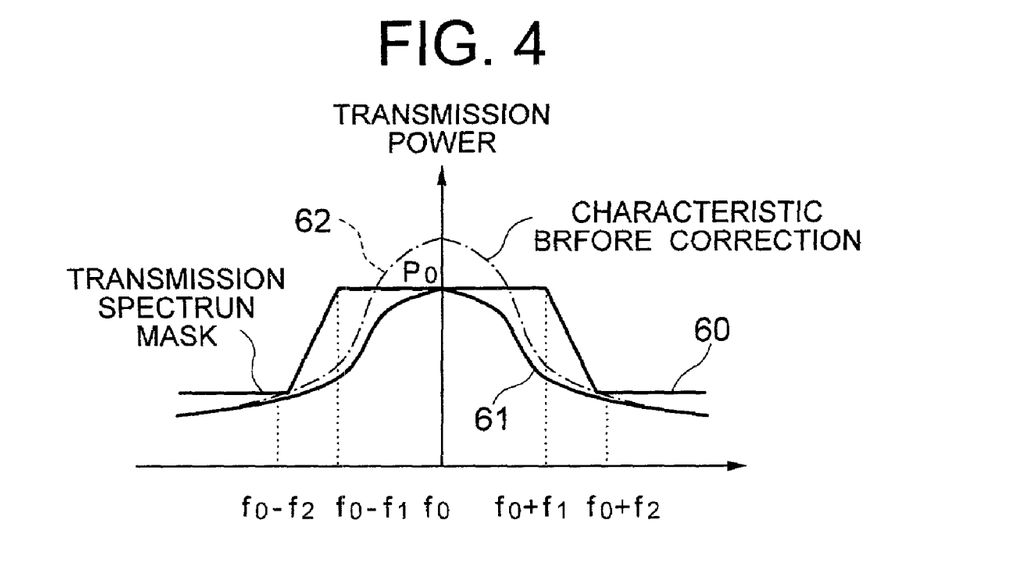
FIG. 4 is a diagram showing a control characteristic controlled in a radio according to an embodiment of the present invention.

FIG. 2 shows an example in which a control unit 24 of a radio 20 sets a gain in an amplifier PA 37 included in an RF unit 21 via a signal line 4. In the RF unit 21 of FIG. 2, however, only a portion relating to the transmission is shown. Numeral 36 denotes an up converter (UC), and numeral 35 denotes a band-pass filter (BPF). Software 51 and software 52 describing a certain new specification criterion are downloaded and held in a storage 25. In the present embodiment, a gain to be set in the PA 37 is described as xx in the software 52. In the software 51, transmission power P serving as a criterion for a frequency f, and a frequency resolution $\Delta f$ are described. In each radio, the measured value of transmission power as a function of the gain is previously incorporated in the control unit 24 under conditions of the specification or conditions under which the specification is expected to be implemented. An example of measured value of transmission power plotted as a function of the gain is shown in FIG. 3. An example of a transmission power criterion is shown in FIG. 4. In the case where transmission power for a gain xx exceeds a maximum transmission power $P_0$ serving as a criterion, the control unit 24 sets the gain equal to $g_0$ or less so as to make the transmission power equal to $P_0$ or less. In the case where transmission power for a gain xx does not exceed the maximum transmission power $P_0$ serving as the criterion, the control unit 24 sets the gain xx in the PA 37.

It is now assumed that a lowest transmission power which can be implemented in the radio 20 is $P_1$ and the gain at that time is $g_1$ as shown in FIG. 3. In the case where $P_0 < P_1$, the control unit 24 display a message to the effect that there is no solution satisfying the criterion, on a user interface 26, and the control unit 24 does not conduct radio wave transmission.

In the embodiments heretofore described, there is shown the example in which a gain is set in the amplifier. Alternatively, an attenuation factor may be set in an attenuator so as to make the transmission power for the gain xx equal to or less than the transmission power prescribed by the specification criterion.

Figure 5:
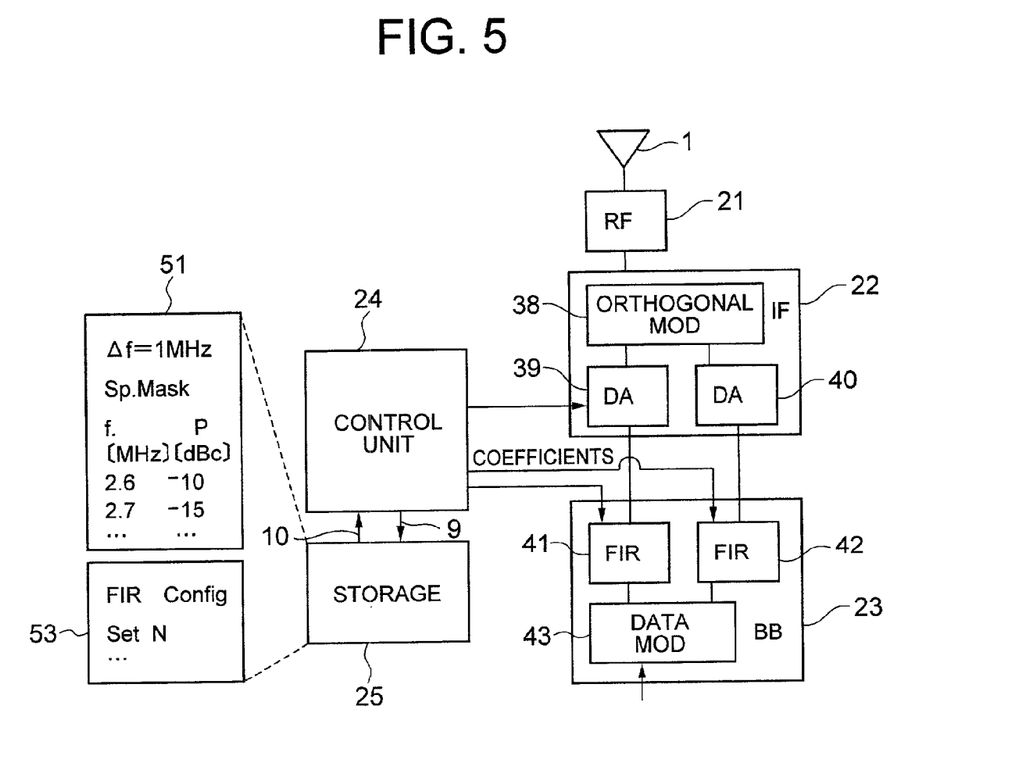
FIG. 5 is a block diagram showing an example of a radio according to another embodiment of the present invention.
Figure 6:
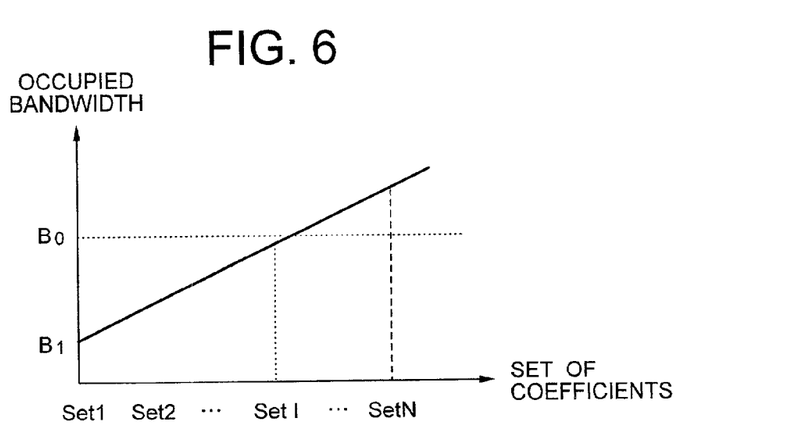
FIG. 6 is a diagram showing a control characteristic controlled in a radio according to an embodiment of the present invention.

FIG. 5 shows an example in which a control unit 24 of a radio 20 sets coefficients in an FIR 41 and an FIR 42 included in a BB unit 23 via a signal line 8. The FIR 41 and FIR 42 are FIR (Finite Impulse Response) digital filters. The FIR 41 and FIR 42 are implemented by using software executed by, for example, a DSP (digital signal processor) or a programmable circuit. In each radio, a measured value of occupied bandwidth for each set of FIR coefficients and coefficient values for each set of coefficients are previously incorporated in the control unit 24 under conditions of the specification or conditions under which the specification is expected to be implemented. FIG. 6 shows an example of the measured value of occupied bandwidth for each set of coefficients of the FIR 41 and FIR 42. The occupied bandwidth means a bandwidth including power which is equal to 99% of total power.

Figure 7:
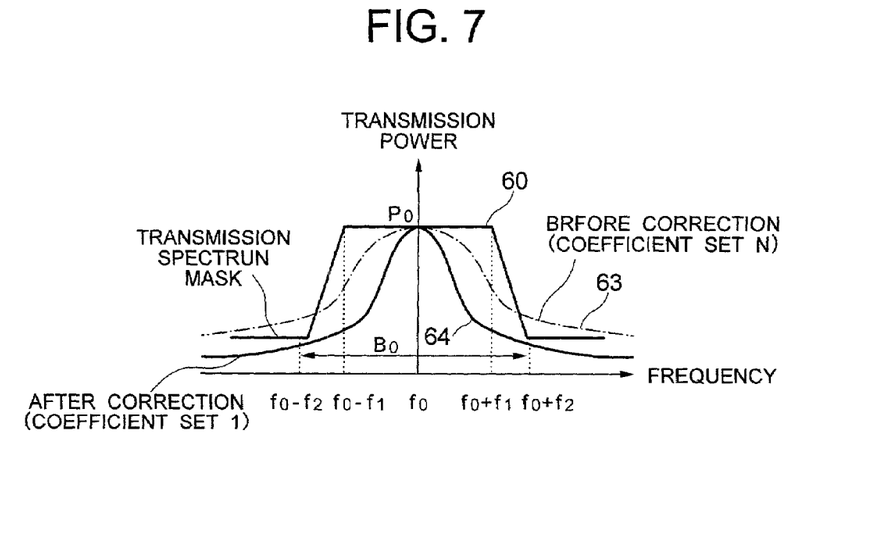
FIG. 7 is a diagram showing a control characteristic controlled in a radio according to an embodiment of the present invention.

FIG. 7 shows an example of a transmission power criterion. The control unit 24 derives an occupied bandwidth from a transmission spectrum mask serving as a criterion, and compares the occupied bandwidth with a bandwidth of preset coefficients. If the occupied bandwidth of preset coefficients exceeds the occupied bandwidth of the criterion, control is conducted so that the occupied bandwidth of preset coefficients will not exceed the occupied bandwidth of the criterion. Software 53 shown in FIG. 5 has a certain new specification criterion described therein. The software 53 has a set of coefficients to be set in the FIR 41 and the FIR 42, specified as "Set N." Software 51 is the same as that shown in FIG. 2. The control unit 24 analyzes the software 51, and derives a bandwidth $B_0$ containing 99% of total power around a frequency $f_0$. If an occupied bandwidth for the "Set N" which is a set of coefficients to be set exceeds $B_0$, the control unit 24 selects such a set of coefficients that the occupied bandwidth becomes $B_0$ or less, as "Set 1." The control unit sets values of the set of coefficients specified by the "Set 1" in the FIR 41 via the signal line 8, and sets values of the same set of coefficients in the FIR 42.

It is now assumed that setting of a narrowest band of the FIR 41 and FIR 42 which can be implemented by the radio 20 is "Set 1" and an occupied bandwidth at this time is $B_1$ as shown in FIG. 6. If $B_0 < B_1$, the control unit 24 display a message to the effect that there is no solution satisfying the criterion, on a user interface 26, and the control unit 24 does not conduct radio wave transmission.

Figure 8:
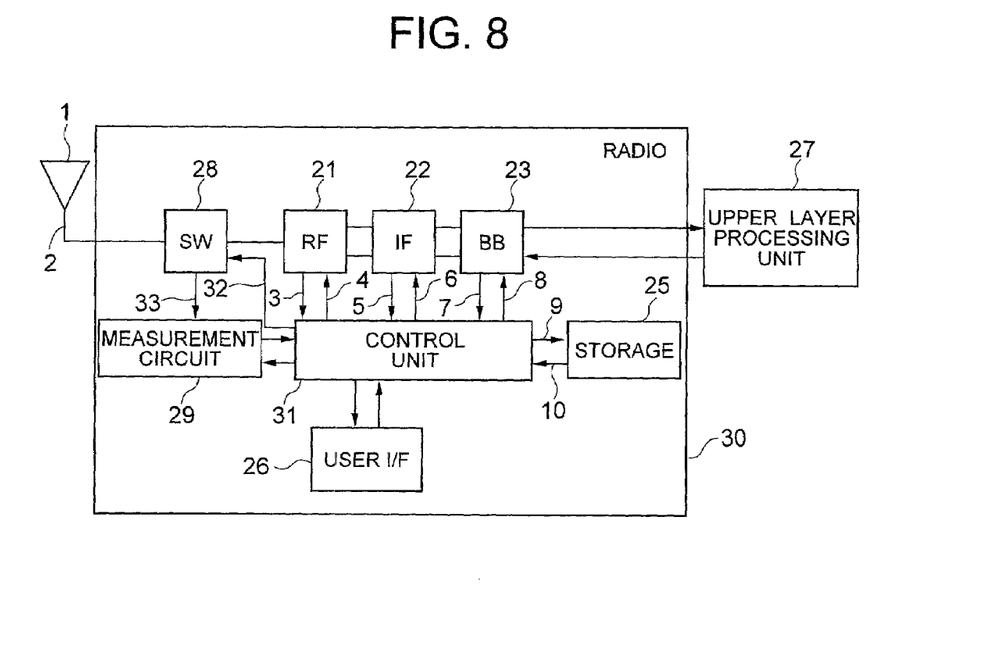
FIG. 8 is a block diagram showing an example of a radio according to another embodiment of the present invention.

FIG. 8 shows another embodiment of the present invention. A software defined radio shown in FIG. 8 includes a control unit 31 for comparing a measured value obtained from a measurement circuit 29 with information of the specification criterion and conducting control of the radio so as to make the radio satisfy the specification, and a switch 28 for disconnecting the control unit 31 from a transmission antenna 1. The control unit 31 sends a signal to the switch 28 via a signal line 32. When measurement is conducted by the measurement circuit 29, the switch 28 disconnects the antenna 1 so as not conduct radio wave radiation. The control unit 31 disconnects the antenna 1 before start of communication, sets a measurement condition prescribed in the specification into the measurement circuit 29, and measures transmission power. Components have the same functions as those of FIG. 1. Description thereof has been omitted.

Figure 9:
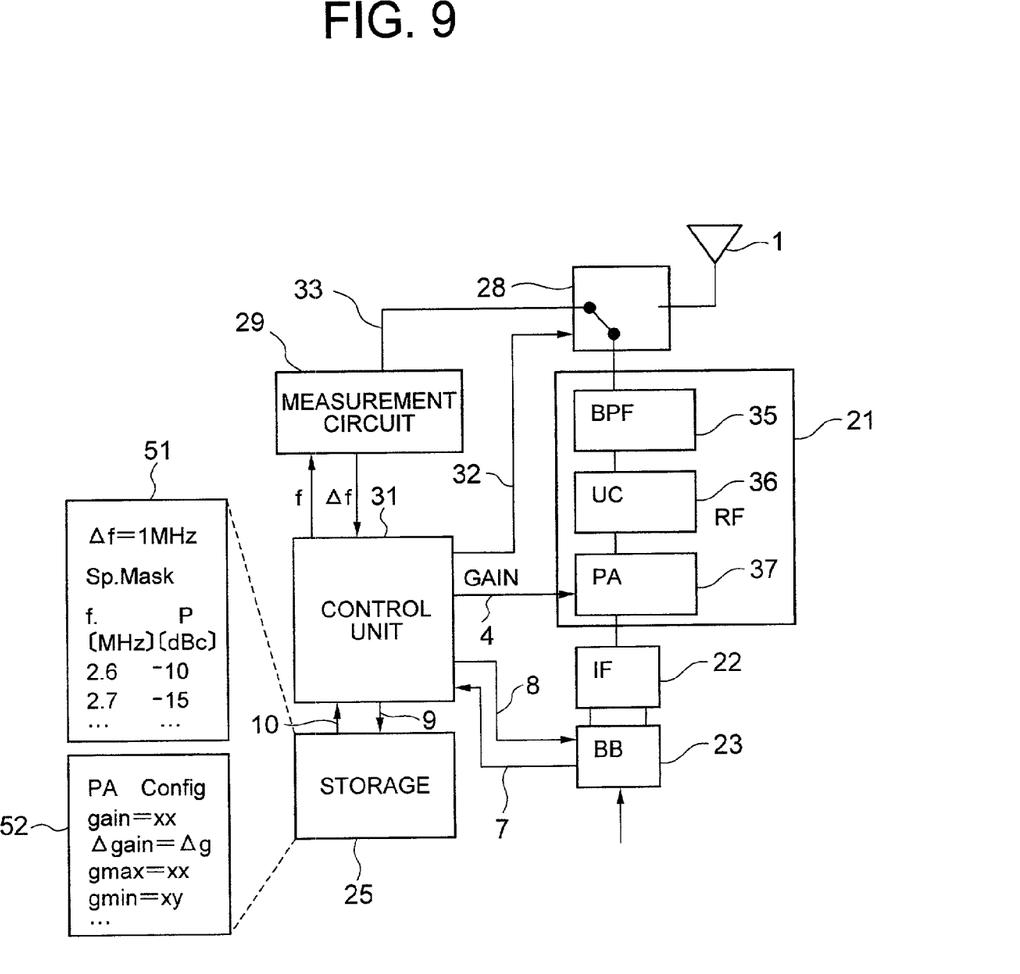
FIG. 9 is a block diagram showing an example of a radio according to another embodiment of the present invention.

FIG. 9 shows an example in which a control unit 31 of a radio 30 sets a gain in a PA 37 of an RF unit 21 via a signal line 4. The control unit 31 analyzes software 52 and conducts hardware and software setting based upon the specification. In the present example, the control unit sets a gain xx in the PA 37 via the signal line 4. The control unit 31 sets a switch 28 via a signal line 32 so as to disconnect an antenna 1 and input a transmission signal to a measurement circuit 29. The control unit 31 sets a measurement condition in the measurement circuit 29 and measures transmission power. Components have the same functions as those of FIG. 2. Description thereof has been omitted. Referring to FIG. 4 again, the control unit 31 measures transmission power under a condition given to software 51, obtains a curve 62 with a feeder loss and an antenna gain added, and compares the curve 62 with 60 serving as a criterion. Feeder and antenna characteristics are previously incorporated into the control unit for each radio. If the curve 62 exceeds a maximum allowable power $P_0$, then the control unit 31 decreases the gain by $\Delta g$, sets a resultant gain in the PA 37, and conducts the measurement again. If the control unit 31 has obtained a curve 61 satisfying the criterion 60 by repeating similar operations, then the control unit 31 sets the switch 28 via the signal line 32 so as to connect the antenna 1, and starts transmission. The control unit 31 changes the gain within a range specified by a maximum value $g_{max}$=xx and a minimum value $g_{min}$=xy which are described in the software 52. The control unit 31 sets the minimum value $g_{min}$=xy in the PA 37. If power P with the measured feeder loss and antenna gain added is greater than allowable power $P_0$, then the control unit 31 displays a message to the effect that there is no solution satisfying the criterion, and does not conduct transmission.

Figure 10:
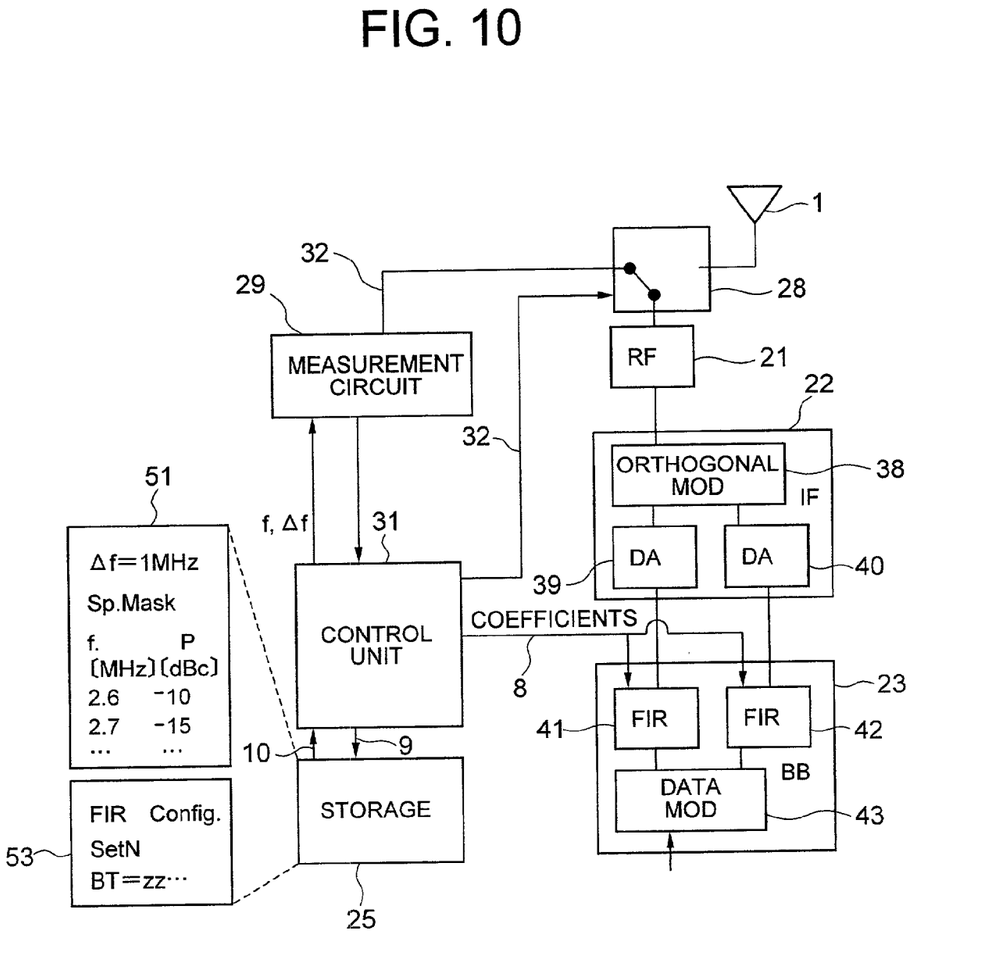
FIG. 10 is a block diagram showing an example of a radio according to another embodiment of the present invention.

FIG. 10 shows an example in which a control unit 31 of a radio 30 sets coefficients in an FIR 41 and an FIR 42 included in a BB unit 23 via a signal line 8. The control unit 31 sets a switch 28 via a signal line 32 so as to disconnect an antenna 1 and input a transmission signal to a measurement circuit 29. The control unit 31 sets a measurement condition in the measurement circuit 29 and measures transmission power. Components have the same functions as those of FIG. 5. Description thereof has been omitted. Referring to FIG. 7 again, the control unit 31 measures transmission power under a condition given to software 51, obtains a curve 63 with a feeder loss and an antenna gain added, and compares the curve 63 with 60 serving as a criterion. Feeder and antenna characteristics are previously incorporated into the control unit for each radio. If an occupied bandwidth of the curve 63 exceeds an occupied bandwidth $B_0$ of the curve 60 serving as a criterion, then the control unit 31 selects a set of coefficients having an occupied bandwidth from "Set N," sets the set of coefficients in the FIR 41 and the FIR 42, and conducts the measurement again. If the control unit 31 has obtained a curve 61 satisfying the criterion 60 by repeating similar operations, then the control unit 31 sets the switch 28 via the signal line 32 so as to connect the antenna 1, and starts transmission.

In the present embodiment, values of filter coefficients are previously incorporated into the control unit 31. Alternatively, the control unit 31 may calculate filter coefficients on the basis of a filter impulse response equation of the filter and set the filter coefficients in the filter. For example, by changing a variable BT of a filter impulse response equation of a Gaussian filter, the control unit 31 calculates coefficients, and sets the coefficients in the filter, where BT is a 3 dB bandwidth normalized by a clock frequency 1/T. The control unit 31 analyzes software 53, calculates a set of coefficients for BT=zz, and sets the set of coefficients in the FIR 41 and FIR 42. For example, in the case where sampling is conducted M times per symbol and L-symbol data is convolved, the control unit 31 calculates coefficients $a_i$ by using the following equation.

$$\alpha_i = \sqrt{\frac{\pi}{2\ln 2}} \frac{BT}{M} \exp\left[-\frac{2}{\ln 2}\left(\frac{i\pi BT}{M}\right)^2\right], \alpha_{-i} = \alpha_i,$$

wherein $i = 0, 1, \ldots, L*M - 1$

The control unit 31 sets a switch 28 via a signal line 32 so as to disconnect an antenna 1 and input a transmission signal to a measurement circuit 29. The control unit 31 sets a measurement condition in the measurement circuit 29 and measures transmission power. Referring to FIG. 7 again, the control unit 31 measures transmission power under a condition given to software 51, obtains a curve 63 with a feeder loss and an antenna gain added, and compares the curve 63 with 60 serving as a criterion. If an occupied bandwidth of the curve 63 exceeds an occupied bandwidth $B_0$ of the curve 60 serving as a criterion, then the control unit 31 decreases BT, calculates coefficients again, sets the calculated coefficients in an FIR 41 and an FIR 42, and then conducts measurement. If the control unit 31 has obtained a curve 61 satisfying the criterion 60 by repeating similar operations, then the control unit 31 sets the switch 28 via the signal line 32 so as to connect the antenna 1, and starts transmission.

Figure 11:
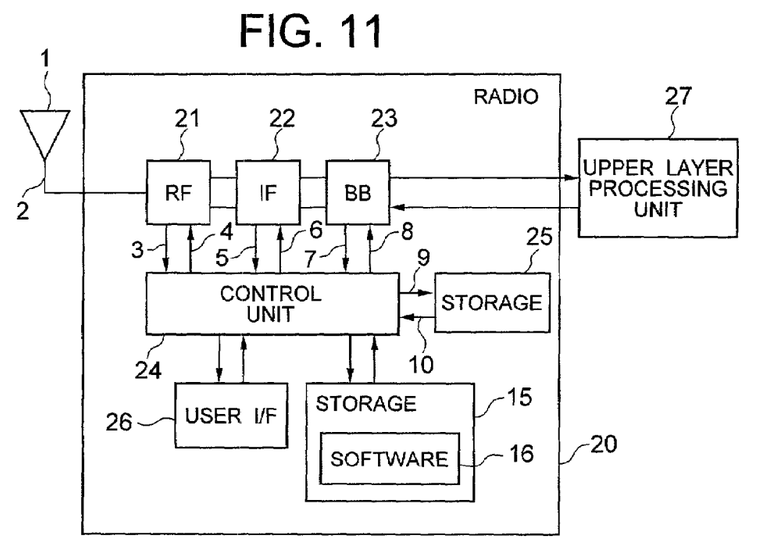
FIG. 11 is a block diagram showing an example of a radio according to another embodiment of the present invention.

FIG. 11 shows another embodiment of the present invention. In FIG. 11, there is shown such a radio that a user interface 26 for displaying a state of the radio and a storage 15 for holding software to implement such a specification as to make communication possible are included, and in the case where there is no solution satisfying a specification criterion, a control unit 24 displays a message to that effect on the user interface 26 and sets the specification making communication possible. In a storage 15, software 16 for implementing a certain specification (referred to as specification for the time of abnormality). The software 16 is a program which is executed in the control unit 24 to set the specification for the time of abnormality. As for this program, operation confirmation and authentication were conducted at the time of approval before shipping of the radio. If in the case where introduction of a new specification has failed the control unit 24 executes the program 16 and thereby sets the radio to the specification for the time of abnormality, therefore, the radio can conduct communication based on setting of the specification for the time of abnormality. In the present embodiment as well, gain setting and filter coefficient setting can be conducted in the same way as the description made by referring to FIGS. 2 and 5. The present embodiment differs from the description made by referring to FIGS. 2 and 5 in operation conducted in the case where there is no solution satisfying the specification criterion. The embodiment will now be described laying stress on the difference.

It is now assumed that a lowest transmission power which can be implemented in a radio 20 is $P_1$ and the gain at that time is $g_1$ as shown in FIG. 3. In the case where $P_0 < P_1$, the control unit 24 display a message to the effect that there is no solution satisfying the criterion, on the user interface 26. In addition, the control unit 24 starts the software 16 held in the storage 15. The control unit 24 sets the RF unit 21, the IF unit 22, the BB unit 23, and the user IF 26 to the specification for the time of abnormality. Even in the case where the new specification is not satisfied and introduction thereof has failed, it becomes possible for the radio 20 to conduct communication according to the specification for the time of abnormality. A storage which holds transmission power information 51 is a storage 25. A storage holding the software 16 which is sufficient for implementing the specification making communication possible can be conducted is a storage 15. In the present example, the radio 20 has two separate storages. Alternatively, the software may also be held in the storage 25.

Figure 12:
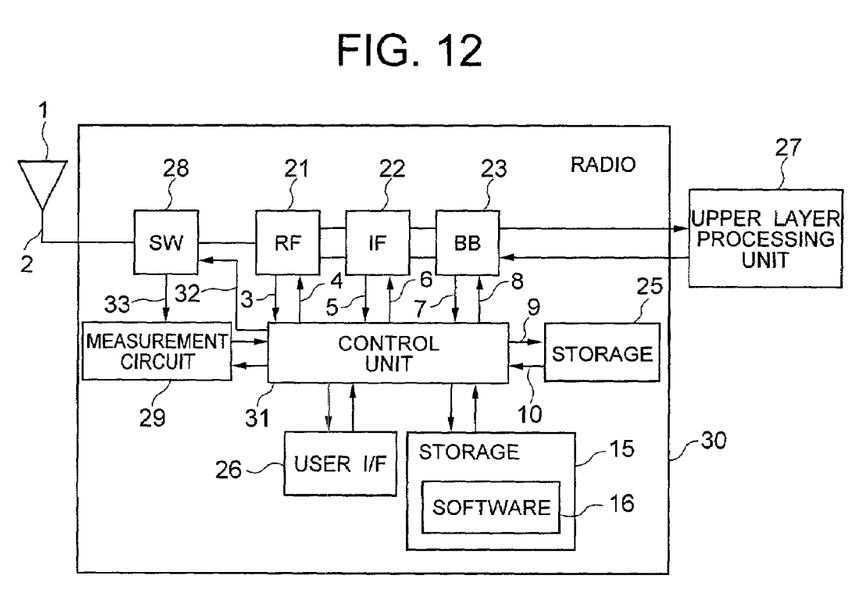
FIG. 12 is a block diagram showing an example of a radio according to another embodiment of the present invention.

FIG. 12 shows a different embodiment. A software defined radio shown in FIG. 12 differs from that of FIG. 6 or 11 in that a switch 28 and a measurement circuit 29 are provided. The switch 28 and the measurement circuit 29 are the same as those described by referring to FIG. 8.

In the embodiments described by referring to FIGS. 1 to 12, control is conducted so that the maximum value of transmission power and/or the transmission frequency bandwidth may satisfy the specification criterion. Alternatively, the transmission and reception characteristics controlled so as to satisfy the specification criterion may be the frequency shift of the FSK modulation system, transmission frequency stability, power at the time when the carrier is not transmitted, information transmission rate, or transmission rate deviation.

Figure 13:
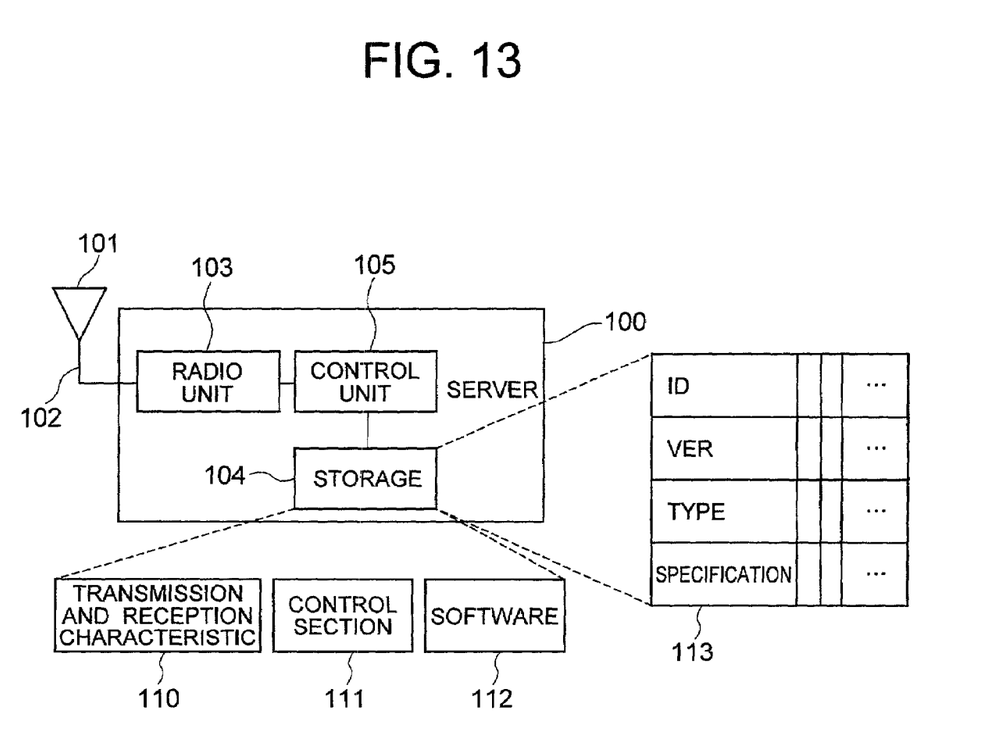
FIG. 13 is a diagram showing an embodiment of a server for delivering software to radios according to an embodiment of the present invention.

FIG. 13 shows an embodiment of a server 100 which provides software to a radio. An antenna 101 is connected to a radio unit 103. A control unit 105 is connected to the radio unit 103 and a storage 104. In the storage 104, there are held software 110 which describes transmission and reception characteristic information, software 111 which describes control information for controlling the control unit of a radio so as to satisfy a specification criterion, and software 112 other than software for conducting control so as to satisfy the transmission and reception characteristic information and specification criterion. The programs 51 and 52 shown in FIG. 2 are examples of the software 110 and 112, respectively. The software 111 is, for example, a program for controlling the control unit 24. It is assumed in the present example that the software 110 and 112 have been approved and encrypted in a predetermined agency. For example, the software 110 is encrypted by processing shown in FIG. 14a. Software 120 is software describing transmission and reception characteristic information approved by a predetermined agency. The predetermined agency conducts inspection by making the software 120 operate in a radio configuration which represents a type of a certain radio configuration, and approves the software 120 if the software 120 satisfy the specification. The type of the radio configuration is a type determined by the hardware configuration of the radio and basic OS operating in this hardware. Scrambled information 123 is obtained by calculating a cyclic redundancy check code 121 for alteration detection, adding the code 121 to the software 120, and encrypting (scrambling) the result. While a cyclic redundancy check code is used in the present embodiment, a code other than this may be used. A header 122 is added to the information 123. A software ID 125, a software version 126, a radio configuration type 127, and a specification 127 are described in the header 122. In the radio configuration type 127, the type of the radio configuration used in the approval inspection is stored. The software 111 is also encrypted by similar processing.

Figure 14:
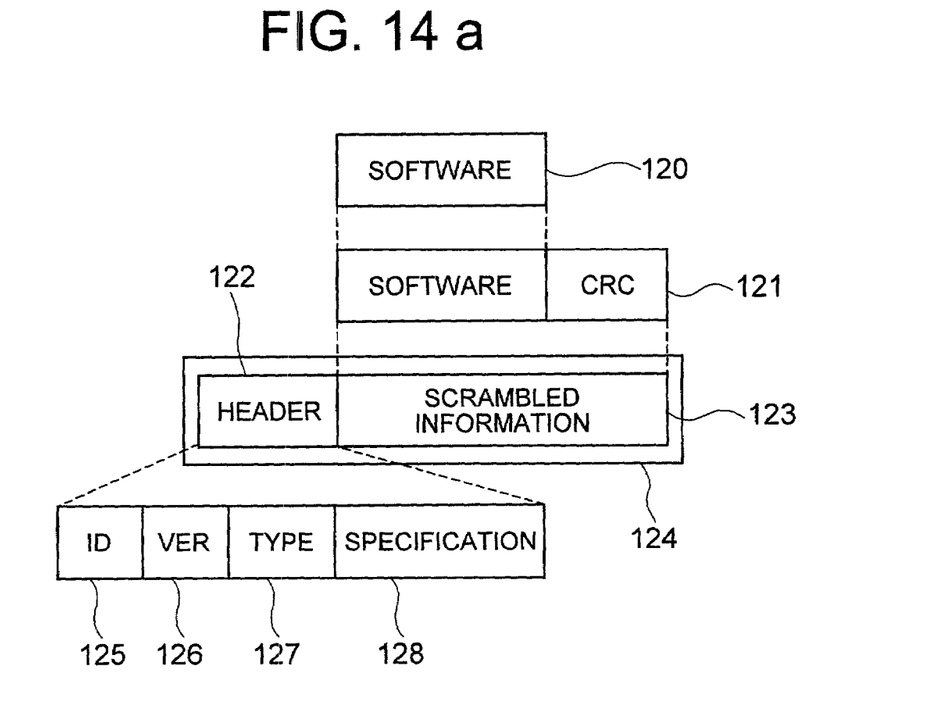
FIGS. 14a and 14b are diagrams showing configurations of software delivered by a server.

On the other hand, in the present embodiment, the software 112 has been subjected to processing shown in FIG. 14b. In the same way as the processing shown in FIG. 14a, a CRC is added to the software, but encryption is not conducted. A header 122 is added to the software with the CRC added thereto, in the same way as the processing shown in FIG. 14a. The software 112 is software describing a parameter to be set in the radio. It is now being studied to make the way of description of the software 112 open as a common description language. In the present embodiment, therefore, the software 112 is not encrypted.

Referring to FIG. 13 again, the control unit 105 creates a list 113 of software which can be downloaded by the radio, on the basis of the header 122 of software added to the storage 104. The software ID 125, the software version 126, the radio configuration type 127, and the specification 128 described in the header of the added software are described in the list 113. The radio specifies the type of the radio configuration and a specification criterion to be downloaded, and transmits a download request to the server 100. For example, taking the radio 30 of FIG. 8 as an example, the user may give a specification to be downloaded and a type of a radio configuration to the control unit 31 via the user interface 26. Or it is also possible that, for example, the type of the radio configuration is previously held in the storage 25 and the control unit 31 reads out and specify it. The control unit 105 of the server 100 refers to headers 122 of a plurality of pieces of software held in the storage 104, selects the requested software 110, 111 and 112, and transmits them to the radio 30 via the radio unit 103 and the antenna 101.

In another example of software downloading, the server 100 transmits the list 113 to the radio 30. The control unit 31 of the radio 30 selects an ID 125 conforming to the type 127 of the own radio configuration among specifications 128 to be implemented after alteration, from the list 113. The radio 30 specifies the ID 125 and transmits a downloading request. The control unit 105 of the server 100 refers to headers 122 of a plurality of pieces of software held in the storage 104, selects the software 110, 111 and 112 of the requested ID, and transmits them to the radio 30.

The control unit 31 of the radio 30 descramble the received software 110 and 111, and decodes information of the software 120 and the code 121. The control unit 31 calculates a cyclic redundancy check code for software 120 with a predetermined generation polynomial and an initial value, and compares a resultant code with the added code 121. Only in the case of coincidence, the control unit 31 judges the software 200 not to have been altered, and uses the software 120. In the same way, the control unit 31 of the radio 30 calculates a code for the software 120 of the received software 112, compares a resultant code with the added code 121, and uses the software 120 in the case of coincidence.

While an example of simple encryption has been described, stronger encryption may also be applied. A sophisticated method, such as addition of a digital signature to software to be distributed, for the purpose of encryption and falsification inspection, may also be used. The agency which approves the software to be distributed may differ from the agency which conducts code addition for the purpose of falsification detection and encryption. The software 110 of the transmission and reception characteristic information may be integral with the software 111 for conducting control which satisfies the specification criterion.

In the foregoing description, there has been shown an example in which software from the server is delivered to a radio in a wireless form. However, delivery may also be conducted in a wire form or by using a medium such as CD-ROM.

A software defined radio according to an embodiment of the present invention includes a storage for holding transmission and reception characteristic information serving as a specification criterion, and a control unit for conducting setting of the radio so as to satisfy the specification criterion. When downloading software for implementing a new specification to the radio and conducting resetting, therefore, it can assure that the transmission and reception characteristic satisfy the specification criterion. Furthermore, the radio includes a storage for holding transmission and reception characteristic information serving as a specification criterion, a measurement circuit for measuring the transmission and reception characteristic, a transmission antenna, and a control unit for comparing a measured value obtained from the measurement circuit with information of the specification criterion, and conducting setting of the radio so as to satisfy the specification. When downloading software for implementing a new specification to the radio and conducting resetting, therefore, it can assure that the transmission power satisfy the specification criterion on the basis of a measurement result of an individual radio characteristic.

Furthermore, the software defined radio includes a switch for disconnecting the transmission antenna. At the time of measurement, the transmission antenna is disconnected and consequently unnecessary radio wave transmission is not conducted. Furthermore, the software defined radio includes a user interface for displaying the state of the radio. In the case where there is no solution satisfying the specification criterion, the control unit displays a message to that effect on the user interface and suppresses radio wave transmission. As a result, it becomes possible to prevent unnecessary radio wave transmission. In addition, the user can suspend introduction of a specification which does not satisfy the criterion. Furthermore, the software defined radio includes a user interface for displaying the state of the radio, a storage for holding sufficient software to implement a specification which makes communication possible, and a control circuit. In the case where there is no solution satisfying the specification criterion, the control unit displays a message to that effect on the user interface and sets the radio in a state of the specification which makes communication possible. Even in the case where a specification attempted to be introduced does not satisfy the criterion, the radio need not conduct unnecessary radio wave transmission and such a state as to make communication possible can be recovered.

Furthermore, the software defined radio includes an amplifier or an attenuator, and a control unit for controlling an amplification factor or an attenuation factor respectively in an amplifier or an attenuator so as to attain at most a transmission power serving as a specification criterion. Therefore, radio wave transmission with a transmission power exceeding the specification criterion is avoided. Furthermore, the software defined radio includes a transmission filter, and a control unit for controlling a characteristic of the filter so as to attain at most a frequency bandwidth serving as a specification criterion. As a result, radio wave transmission with an occupied bandwidth exceeding a prescribed occupied bandwidth is avoided.

In an approval system according to an embodiment of the present invention, approval of only transmission and reception characteristic information serving as a specification criterion and a control section for conducting setting so as to satisfy the specification criterion, included in software, is conducted. Therefore, a portion of the software which is not subjected to approval has a degree of freedom. Without a complicated notification to an approval agency, therefore, bug fixing and version up can be conducted by altering a portion which can be freely rewritten. Furthermore, a competitive environment such as introduction of a more excellent algorithm is obtained. Furthermore, in the approval system of the present invention, a control unit for causing satisfaction of a specification criterion is provided in a radio, and only a radio at the time when fabrication has been completed, transmission and reception characteristic information serving as a specification criterion, and a control section for setting so as to satisfy the specification criterion are subjected to approved. When altering the specification by re-programming, therefore, assurance of the specification criterion can be conducted easily without carrying the radio in an agency for the purpose of re-inspection. Furthermore, in the approval system of the present invention, software is approved and then information for detecting falsification is added, and encryption and distribution are conducted. As a result, the distributed software is concealed. In addition, it can be confirmed in the radio after downloading that the software is regular software approved by a predetermined agency.

Furthermore, in a software defined radio system according to an embodiment of the present invention, a radio has means for downloading software of a control section for conducting setting so as to satisfy a specification criterion, from a server, and means for transmitting configuration information of the radio to the server. Or the server has means for transmitting a list of a radio configuration which can be controlled, to the radio. The server or the radio has means for selecting the control section and downloading it. In the case where control of a specification depending on the radio configuration is necessary, suitable software can be selected and downloaded.

The invention claimed is:

1. A software defined radio apparatus comprising:
   an antenna for transmission and reception of radio signals,
   a radio frequency unit,
   a baseband unit,
   a control unit,
   a storage for storing software for defining function of said software defined radio and specification criterion prescribing radio transmission characteristics,
   a measurement circuit for making measurement of a transmission characteristic of a radio signal to be transmitted from said software defined radio apparatus, and
   a switch connected to said antenna, said radio frequency unit, and said measurement circuit,
   wherein
   said control unit for conducting alteration on setting of said base band unit and said radio frequency unit so as to satisfy said second specification criterion, based on said information concerning said second specification criterion prescribing radio transmission characteristics, and
   wherein when said measurement circuit measures the transmission characteristic, said switch disconnects said radio frequency unit from said antenna and connects said radio frequency unit to said measurement circuit so as to transmit transmission data to said measurement circuit.

2. A software defined radio apparatus according to claim 1, wherein said radio downloads a new software and a new specification criterion and said control unit conducts alteration on setting of said baseband unit and said radio frequency unit according to said new software and said new specification criterion, further comprising:
   a user interface,
   wherein if said control unit cannot conduct alteration on the setting of said baseband unit and said radio frequency unit so as to satisfy said new specification criterion, said control unit displays a message to that effect on said user interface.

3. A software defined radio apparatus according to claim 1,
   wherein if said control unit cannot conduct alteration on the setting of said baseband unit and said radio frequency unit so as to satisfy said specification criterion, said control unit conducts control for suppressing radio wave transmission.

4. A software defined radio apparatus according to claim 2, further comprising:
   a storage for holding software describing a specification previously confirmed to make communication possible,
   wherein if said control unit cannot conduct alteration on the setting of said baseband unit and said radio frequency unit so as to satisfy said new specification criterion, said control unit sets said specification described in said software, in said baseband unit and said radio frequency unit.

5. A software defined radio apparatus according to claim 1, wherein said radio frequency unit comprises an amplifier or an attenuator, and said control unit sets an amplification factor or an attenuation factor respectively in said amplifier or attenuator so as to attain at most a transmission power prescribed by said specification criterion.

6. A software defined radio apparatus according to claim 1, wherein said baseband unit comprises a transmission filter, and said control unit sets a characteristic of said transmission filter so as to attain at most an occupied bandwidth prescribed by said specification criterion.

7. A software defined radio apparatus comprising:

an antenna for transmission and reception of radio signals, a radio frequency unit, a baseband unit, a control unit, a storage for storing software for defining function of said software defined radio and specification criterion prescribing radio transmission characteristics, a measurement circuit for making measurement of a transmission characteristic of a radio signal to be transmitted from said software defined radio apparatus, and a switch connected to said antenna, said radio frequency unit, and said measurement circuit, wherein said control unit estimates a radio transmission characteristic of said software defined radio based on said software, said baseband unit and said control unit, and compares said estimated radio transmission characteristic with said specification criterion, and conducts alteration on setting of said baseband unit and said radio frequency unit so as to satisfy said specification criterion prescribing radio transmission characteristic, and wherein when said measurement circuit measures the transmission characteristic, said switch disconnects said radio frequency unit from said antenna and connects said radio frequency unit to said measurement circuit so as to transmit transmission data to said measurement circuit.

* * * * *